(12) United States Patent
Rodriguez Bravo et al.

(10) Patent No.: US 11,247,695 B2
(45) Date of Patent: Feb. 15, 2022

(54) AUTONOMOUS VEHICLE DETECTION (71) Applicant: KYNDRYL, INC., New York, NY (US)

(72) Inventors: Cesar Augusto Rodriguez Bravo, Heredia (CR); Gregory J. Boss, Saginaw, MI (US); David Jaramillo, Durham, NC (US); Romelia H. Flores, Keller, TX (US)

(73) Assignee: Kyndryl, Inc., New York, NY (US)

( * ) Notice: Subject to any disclaimer, the term of this patent is extended or adjusted under 35 U.S.C. 154(b) by 175 days.

(21) Appl. No.: 16/411,375

(22) Filed: May 14, 2019

(65) Prior Publication Data

US 2020/0361480 A1    Nov. 19, 2020

(51) Int. Cl.
*B60W 50/029* (2012.01)
*G07C 5/08* (2006.01)
(Continued)

(52) U.S. Cl.
CPC ...... *B60W 50/029* (2013.01); *B60W 50/0205* (2013.01); *B60W 50/14* (2013.01); *G05D 1/0055* (2013.01); *G05D 1/0088* (2013.01); *G05D 1/0212* (2013.01); *G05D 1/0287* (2013.01); *G05D 1/104* (2013.01); *G07C 5/008* (2013.01); *G07C 5/0816* (2013.01); B60W 2050/0215 (2013.01); B60W 2510/0638 (2013.01); B60W 2510/0676 (2013.01);
(Continued)

(58) Field of Classification Search
CPC .......... B60W 50/029; B60W 50/0205; B60W 50/14; B60W 2555/20; B60W 2050/0215; B60W 2510/0638; B60W 2510/0676; B60W 2510/30; B60W 2520/10; B60W 2520/105; G05D 1/0055; G05D 1/0088; G05D 1/0212; G05D 1/0287; G05D 1/104; G05D 2201/0213; G07C 5/008; G07C 5/0816
See application file for complete search history.

(56) References Cited

U.S. PATENT DOCUMENTS 8,126,642 B2    2/2012   Trepagnier
8,392,065 B2    3/2013   Tolstedt
(Continued)

FOREIGN PATENT DOCUMENTS

KR        020180009221        1/2018

OTHER PUBLICATIONS

Mell, Peter et al.; "The NIST Definition of Cloud Computing;" National Institute of Standards and Technology; Special Publication 800-145; Sep. 2011; 7 pages.

*Primary Examiner* — Aniss Chad
*Assistant Examiner* — Madison R Hughes
(74) *Attorney, Agent, or Firm* — Schmeiser, Olsen & Watts; Ken Han (57) ABSTRACT

A method and system for enabling an autonomous vehicle detection process is provided. The method includes detecting a sensor reading, of a sensor integrated with an autonomous vehicle, exceeding a specified threshold value. Additional sensor reading from additional vehicles located within a specified distance of the autonomous vehicle are received and compared to the original sensor reading. In response, a fault condition associated with the sensor is determined and an associated notification is presented to an occupant of the autonomous vehicle.

14 Claims, 9 Drawing Sheets

(51) Int. Cl.
*G05D 1/02* (2020.01)
*G07C 5/00* (2006.01)
*G05D 1/00* (2006.01)
*B60W 50/14* (2020.01)
*B60W 50/02* (2012.01)
*G05D 1/10* (2006.01)

(52) U.S. Cl.
CPC ..... *B60W 2510/30* (2013.01); *B60W 2520/10* (2013.01); *B60W 2520/105* (2013.01); *B60W 2555/20* (2020.02); *G05D 2201/0213* (2013.01)

(56) References Cited

U.S. PATENT DOCUMENTS

| | | | |
|---|---|---|---|
| 9,368,026 B1 | 6/2016 | Herbach | |
| 9,406,177 B2 * | 8/2016 | Attard | G07C 5/008 |
| 9,524,648 B1 | 12/2016 | Gopalakrishnan | |
| 9,567,007 B2 | 2/2017 | Cudak | |
| 9,646,428 B1 | 5/2017 | Konrardy | |
| 9,720,410 B2 | 8/2017 | Fairfield | |
| 9,760,090 B2 | 9/2017 | Shashua | |
| 9,849,882 B2 | 12/2017 | Byun | |
| 9,940,761 B2 * | 4/2018 | Kundu | B64C 39/024 |
| 10,029,696 B1 * | 7/2018 | Ferguson | B60W 40/09 |
| 10,732,627 B1 * | 8/2020 | Roberson | B60W 50/0098 |
| 10,852,744 B2 * | 12/2020 | Browning | G01C 21/32 |
| 2005/0062615 A1 * | 3/2005 | Braeuchle | B60K 31/0008 340/903 |
| 2007/0109105 A1 * | 5/2007 | Ohno | G07C 5/008 340/425.5 |
| 2015/0178998 A1 | 6/2015 | Attard | |
| 2015/0346718 A1 | 12/2015 | Stenneth | |
| 2017/0123428 A1 | 5/2017 | Levinson | |
| 2018/0301034 A1 * | 10/2018 | Morita | G01C 21/3602 |
| 2018/0322431 A1 * | 11/2018 | Folck | G06Q 30/0601 |
| 2019/0033845 A1 * | 1/2019 | Cella | H04L 1/0041 |
| 2019/0066396 A1 * | 2/2019 | Jiang | G01S 7/40 |
| 2019/0106085 A1 * | 4/2019 | Bacchus | B60S 1/56 |
| 2020/0198651 A1 * | 6/2020 | Levy | G05D 1/0293 |

* cited by examiner

AUTONOMOUS VEHICLE DETECTION

FIELD

The present invention relates generally to a method for detecting conditions of an autonomous vehicle and in particular to a method and associated system for improving automotive technology by detecting vehicular sensor readings and detecting and correcting vehicular fault conditions.

BACKGROUND

Typical processes for determining and correcting vehicular conditions include complicated manual intervention. Addressing specific vehicular condition issues typically requires a complicated process that may be time consuming and require a large amount of resources. Additionally, presenting condition issue notifications may require additional human intervention.

Autonomous vehicles are known. In the field of self-driving cars, there exists some definitional uncertainty over the exact meaning of the term "autonomous vehicle." As the term is used herein, autonomous vehicle refers to any vehicle where a computer substantially operates the vehicle, even if some human input is allowed or even required to drive the vehicle. As the term is used herein, "autonomous vehicle": (i) should not be taken to necessarily imply any particular minimum SAE J3016 level of automation; (ii) may rely on artificial aids in their environment, such as magnetic strips; (iii) may be at least partially controlled via communication networks both in the immediate vicinity (for collision avoidance) and farther away (for congestion management); and (iv) includes "automated vehicles" that are not fully independent.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

SUMMARY

A first aspect of the invention provides an autonomous vehicle detection method comprising: enabling, by a processor of a hardware device within an autonomous vehicle, a plurality of sensors integrated with the autonomous vehicle; detecting, by the processor via at least one sensor of the plurality of sensors, a sensor reading exceeding a specified threshold value; receiving, by the processor from an additional plurality of sensors of an additional plurality of vehicles located within a specified distance of the autonomous vehicle, additional sensor readings; comparing, by the processor, the sensor reading to the additional sensor readings; determining, by the processor based on results of the comparing, a fault condition associated with the sensor; and presenting, by the processor to an occupant of the autonomous vehicle, a notification indicating the fault condition.

A second aspect of the invention provides a computer program product, comprising a computer readable hardware storage device storing a computer readable program code, the computer readable program code comprising an algorithm that when executed by a computer processor of a hardware device within an autonomous vehicle implements an autonomous vehicle detection method, the method comprising: enabling, by the processor, a plurality of sensors integrated with the autonomous vehicle; detecting, by the processor via at least one sensor of the plurality of sensors, a sensor reading exceeding a specified threshold value; receiving, by the processor from an additional plurality of sensors of an additional plurality of vehicles located within a specified distance of the autonomous vehicle, additional sensor readings; comparing, by the processor, the sensor reading to the additional sensor readings; determining, by the processor based on results of the comparing, a fault condition associated with the sensor; and presenting, by the processor to an occupant of the autonomous vehicle, a notification indicating the fault condition.

A third aspect of the invention provides a hardware device, within an autonomous vehicle, comprising a computer processor coupled to a computer-readable memory unit, the memory unit comprising instructions that when executed by the computer processor implements an autonomous vehicle detection method comprising: enabling, by the processor, a plurality of sensors integrated with the autonomous vehicle; detecting, by the processor via at least one sensor of the plurality of sensors, a sensor reading exceeding a specified threshold value; receiving, by the processor from an additional plurality of sensors of an additional plurality of vehicles located within a specified distance of the autonomous vehicle, additional sensor readings; comparing, by the processor, the sensor reading to the additional sensor readings; determining, by the processor based on results of the comparing, a fault condition associated with the sensor; and presenting, by the processor to an occupant of the autonomous vehicle, a notification indicating the fault condition.

According to an aspect of the present invention, there is a method, computer program product, computer system and/or autonomous vehicle that performs the following operations (not necessarily in the following order): (i) receiving a first operating parameter value for a first operating parameter relating to the manner in which the first autonomous vehicle is operating when the first autonomous vehicle is travelling in proximity to a set of proximate vehicle(s); (ii) receiving a set proximate operating parameter value(s) for the first operating parameter respectively relating to the manner in which the set of proximate vehicle(s) are operating; (iii) determining an expected range of first operating parameter values based, at least in part, upon the set of proximate operating parameter value(s); (iv) determining that the first operating parameter value is outside of the expected range of first operating parameter values; and (v) responsive to the determination that that the first operating parameter value is outside of the expected range of first operating parameter values, taking a corrective action.

The present invention advantageously provides a simple method and associated system capable of determining and correcting vehicular conditions.

DETAILED DESCRIPTION

Figure 1:
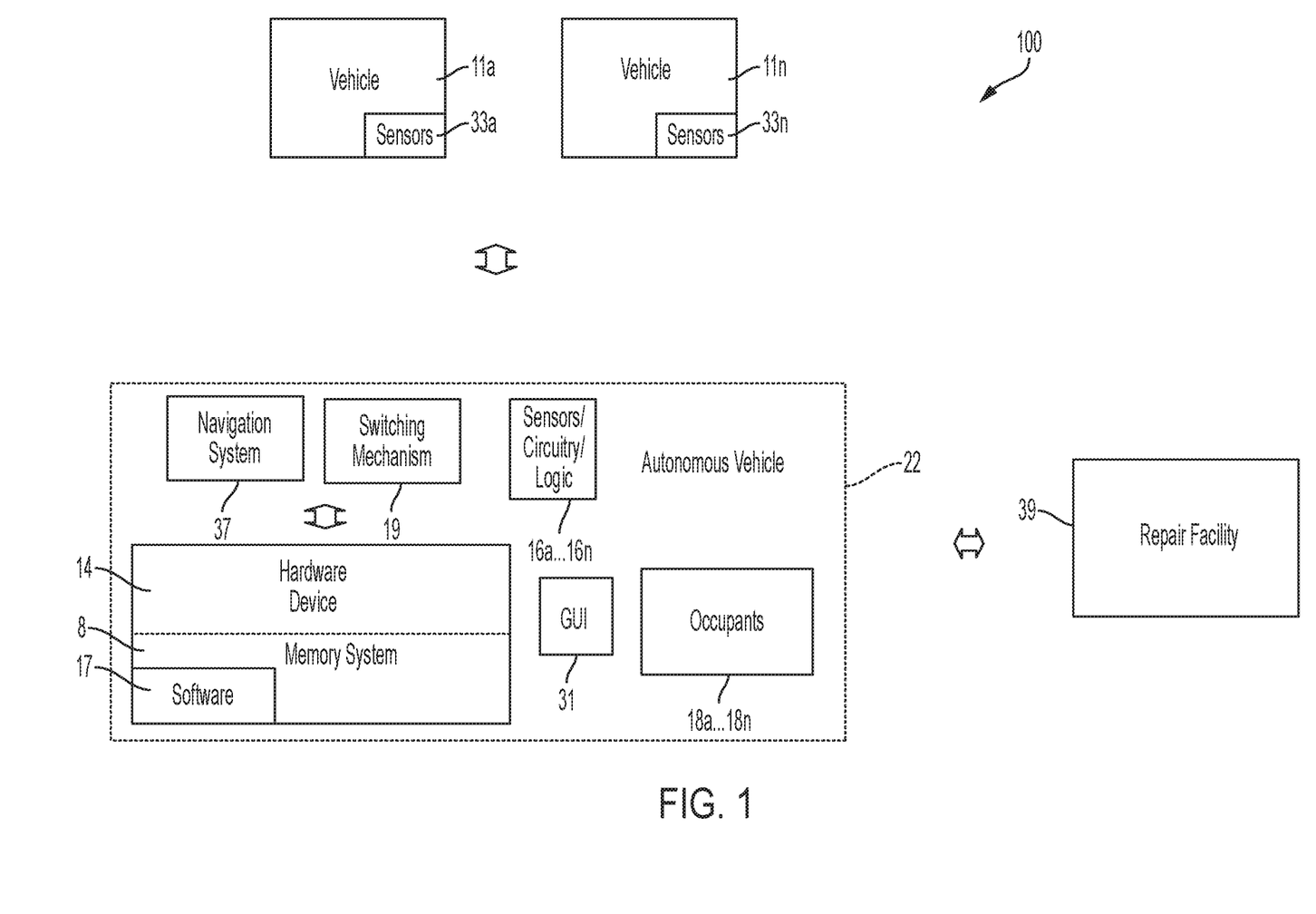
FIG. 1 illustrates a system for improving automotive technology by detecting vehicular sensor readings and detecting and correcting autonomous vehicular fault conditions, in accordance with embodiments of the present invention.

FIG. 1 illustrates a system 100 for improving automotive technology by detecting vehicular sensor readings and detecting and correcting autonomous vehicular fault conditions, in accordance with embodiments of the present invention. Relying on security and safety of an autonomous vehicle typically causes user concern. Current solutions for detecting autonomous vehicle issues may include collecting operational data associated with an operation of a vehicle to determine potential vehicular operational issues. The aforementioned solutions may present inaccurate results due to an inaccuracy of the retrieved data. Therefore system 100 is configured to enable accurate failover systems for improving vehicular sensor readings detection and vehicular fault condition correction.

System 100 is configured to detect compromised actions associated with an autonomous vehicle via execution of a multiple order verification process that includes:
1. Determining a failure or error condition of a sensor integrated with an autonomous vehicle by reporting at least sensor reading exceeding a predetermined threshold.
2. Comparing the at least one sensor reading with sensor readings of additional vehicles for detecting compromised actions of the autonomous vehicle (e.g., a failed sensor) based on differences between the sensor readings.
3. Presenting an alert message (indicating compromised actions of the autonomous vehicle) to an operator of the autonomous vehicle.

Embodiments of the present invention may include the following features, operations, advantages and/or operation: (i) a system that detects nearby autonomous vehicles and obtains sensor readings to perform a second order verification process based on a primary vehicle's sensors in comparison to secondary vehicle(s); (ii) a system that calculates and detects patterns and deviations of multiple correlated sensors in a vehicle. Sensors may include, inter alia, GPS sensors, speedometer sensors, weather sensors, windshield wiper sensors, outdoor light and vehicle lighting sensors, automated driving mode on/off based sensors, etc.; (iii) a system that determines out-of-parameter (e.g., with respect to speed, acceleration, deceleration, transverse position with respect to a roadway, noise emitted, engine speed, front wheel drive setting, rear wheel setting, all-wheel drive setting, headlight setting, taillight setting, dome light setting, vibration, operation of tandem unmanned aerial vehicles (UAVs) wiper status, defrost status, braking patterns, external temperature, internal temperature, engine temperature, etc.) sensor states and assesses an appropriateness to request a plurality of sensor data from a plurality of vehicles in order to detect emergencies, accidents, sensor failure, proactive action on a vehicle function/feature, etc.; (iv) a system that detects numerous nearby vehicles simultaneously switching automated driving mode off for proactive measures on a primary vehicle; (v) uses information from multiple correlated sensors in order to ensure that a potential fault is not determined from a single sensor data point; (vi) reaches out to multiple vehicles and obtains multiple sensor readings in order to perform a second order verification process based on all sensor data available; and/or (vii) detects the specific mode of nearby vehicles switching automated driving mode off for proactive measures on a primary vehicle.

A second order verification process differs from a first order verification because in a second order verification, a vehicle will detect faulty sensors by comparing its own values with derivative values obtained from nearby vehicles. A second order verification (i.e., a derivative calculation) is defined herein as a process for deriving sensor values via an association process and calculations of external (e.g., within additional vehicles) sensors used for deriving vehicular operational values. For example, typical sensors are associated with a primary method for determining if they are functioning properly but there could be cases when a sensor status is detected as being associated with a healthy status because it appears to be working properly. However, the information or values provided as output may comprise incorrect information. For example, a speedometer may appear to be working because it is presenting a speed reading in real time, however the speed reading may comprise an incorrect reading. Therefore, a secondary verification mechanism (for implementing a second order verification process) may be executed to verify if outputs provided by the sensor are correct.

System 100 enables a process for determining that a currently traveling autonomous vehicle comprises a vehicle setting differing from adjacent vehicles in travel thereby triggering and presenting an alert to an operator of the autonomous vehicle. The alert indicates a possible issue associated with the autonomous vehicle. For example, the alert may indicate, inter alia, that all adjacent vehicles (with the exception of the autonomous vehicle) are currently: operating windshield wipers or lights, decreasing a speed of travel, switching to a four-wheel drive mode, etc.

System 100 of FIG. 1 includes a vehicles 11a ... 11n and a repair facility 39 communicatively connected (e.g., via a network) to an autonomous vehicle 22. Autonomous vehicle 22 includes a hardware device 14 (e.g., an onboard computer), a switching (control) mechanism 19, sensors/circuitry/logic 16a ... 16n, a navigation system 37, a graphical user interface (GUI) 31, and occupants 18a ... 18n. Autonomous vehicle 22 is configured to detect operational characteristics of itself (via sensors/circuitry/logic 16a ... 16n) and operational characteristics of vehicles 11a ... 11n (via sensors 33a ... 33n). Hardware device 14, navigation system 37, and switching mechanism 19 may include any type of hardware controller system(s) including, inter alia, an automobile integrated controller computer, a computer (PC), a laptop computer, a tablet, etc. Hardware device 14 includes a memory system 8. Memory system 8 stores program instructions 17 for enabling a process for detecting compromised actions associated with autonomous vehicle 22. Hardware device 14, navigation system 37, sensors/circuitry/logic 16a . . . 16n, and switching mechanism 19 may each comprise a specialized hardware device comprising specialized (non-generic) hardware and circuitry (i.e., specialized discrete non-generic analog, digital, and logic-based circuitry) for executing a process described with respect to FIGS. 1-9. The specialized discrete non-generic analog, digital, and logic-based circuitry may include proprietary specially designed components (e.g., a specialized integrated circuit, such as for example an Application Specific Integrated Circuit (ASIC) designed for only implementing a process for improving automotive technology by detecting vehicular sensor readings and detecting and correcting autonomous vehicular fault conditions. Switching mechanism 19 comprises any type of electrical and/or mechanical control and switching mechanism (for automatically controlling driving functionality of vehicle 22) that may include proprietary specially designed electro/mechanical components (e.g., circuitry, switching relay, control motors, etc.). Sensors/circuitry/logic 16a . . . 16n may include, inter alia, optical sensors, temperature sensors, infrared sensors, speed sensors, GPS sensors, moisture sensors, pressure sensors, motion detector sensors, video cameras, etc.

System 100 enables functionality for detecting (in real-time) a malfunctioning autonomous vehicle (e.g., autonomous vehicle 22) via execution of a cooperative second order verification process as follows:

1. Retrieving data indicating a travel of speed of a plurality of adjacent (to an autonomous vehicle) vehicles (e.g., using vehicle to vehicle communications) and correlating the data with data retrieved from sensors (of the autonomous vehicle) to determine an accuracy, health, and/or failure/error of the sensors of the autonomous vehicle.
2. Monitoring actions of the plurality of adjacent vehicles to determine patterns and deviations associated with patterns of the autonomous vehicle.
3. Analyzing data from vehicles to determine upcoming emergencies or accidents on a route of travel.
4. Requesting consensus analysis from the plurality of adjacent vehicles for retrieving suggestions with respect to travel decisions.
5. Comparing sensor data from sensors of the autonomous vehicle to sensor data from similar sensors of the plurality of adjacent vehicles to detect sensor failures.
6. Generating alerts indicating that additional vehicles are currently traveling outside of parameters of the plurality of adjacent vehicles.
7. Generating alerts indicating that the plurality of adjacent vehicles simultaneously switch off associated autonomous driving features.
8. Generating alerts indicating that the plurality of adjacent vehicles are behaving differently than the autonomous vehicle. For example: each of the plurality of adjacent vehicles have enabled wipers or lights, each of the plurality of adjacent vehicles have enabled all-wheel drive mode, etc.

Figure 2:
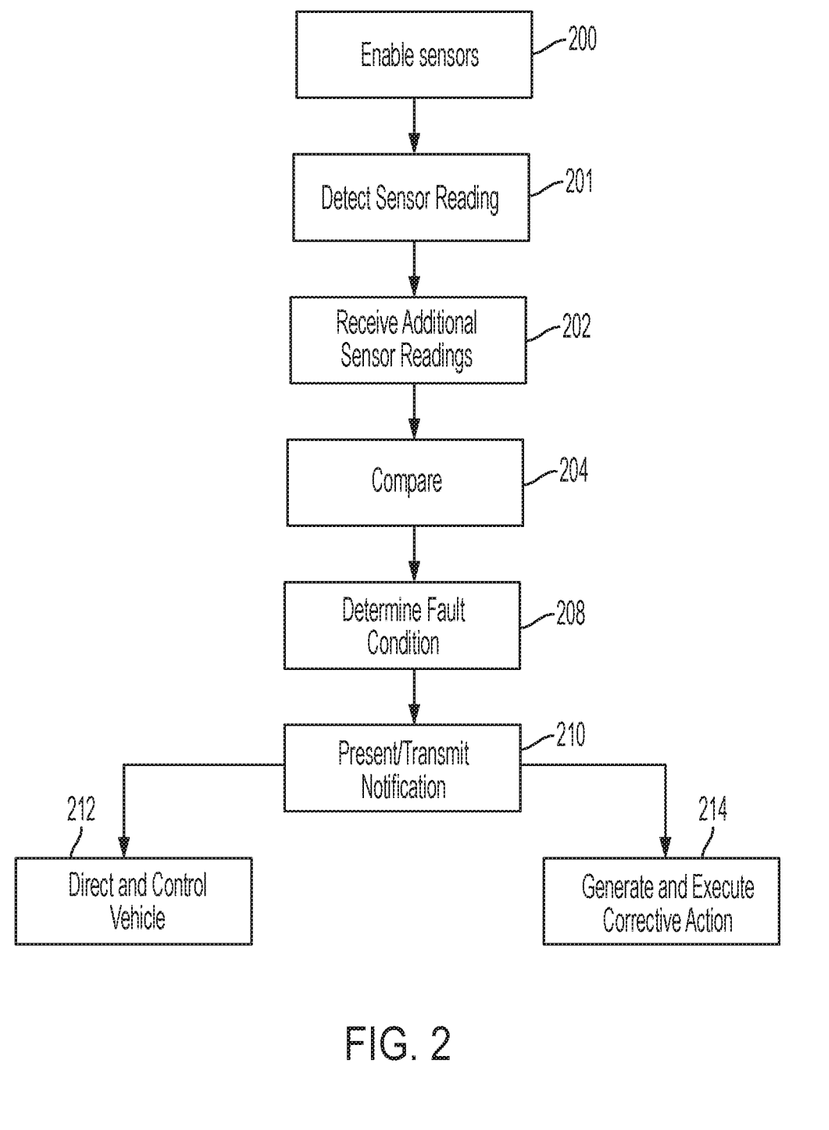
FIG. 2 illustrates a flowchart detailing a process enabled by the system of FIG. 1 for improving automotive technology by detecting vehicular sensor readings and detecting and correcting autonomous vehicular fault conditions, in accordance with embodiments of the present invention.

FIG. 2 illustrates a flowchart detailing a process enabled by system 100 of FIG. 1 for improving automotive technology by detecting autonomous vehicle fault conditions, in accordance with embodiments of the present invention. Each of the steps in the algorithm of FIG. 2 may be enabled and executed in any order by a computer processor executing computer code. In step 200, a plurality of sensors integrated with an autonomous vehicle are enabled by a controller within the autonomous vehicle. In step 201, a sensor reading (of a sensor of the autonomous vehicle) exceeding a specified threshold value is detected. In step 202, additional sensor readings are received from an additional plurality of sensors of additional vehicles located within a specified distance of the autonomous vehicle. The additional sensor readings may indicate a direction and speed of motion readings of the additional vehicles. In step 204, the autonomous vehicle sensor reading is compared to the additional sensor readings. In response, driving patterns of the autonomous vehicle with respect to driving patterns of the additional vehicles may be determined based on the comparison. Additionally, driving based emergencies with respect to a travel route of the autonomous vehicle may be determined based on the comparison.

In step 208, a fault condition associated with the autonomous vehicle sensor is determined based on results of the comparison of step 204. The fault condition may indicate, inter alia, an accuracy level and health condition of the autonomous vehicle sensor, a failure of the autonomous vehicle sensor, a geographical location of the autonomous vehicle, etc. Likewise, the additional sensor readings may indicate geographical readings of the additional vehicles.

In step 210, a notification indicating the fault condition is presented to an occupant of the autonomous vehicle. Alternatively, the notification may be transmitted to a repair facility (e.g., repair facility 39 of FIG. 1). If in step 210, the notification transmitted to the repair facility, then in step 212, the controller automatically directs and controls the autonomous vehicle such that the autonomous vehicle automatically initiates motion and travels to the repair facility. If in step 210, the notification is presented to the occupant, then in step 214, a corrective action for automatically repairing the fault condition is generated and executed. The corrective action may include an automated repair of software associated with the autonomous vehicle sensor. Additionally, the corrective action may include, inter alia, generating and presenting an alert indicating that a vehicle of the additional vehicles is executing traveling parameters differing from traveling parameters executed by the rest of the additional vehicles, generating and presenting an alert indicating that the additional vehicles have simultaneously disabled autonomous features, generating and presenting an alert indicating that the additional vehicles are currently executing vehicular functions differing from vehicular functions currently executed by the autonomous vehicle, etc.

Figure 3:
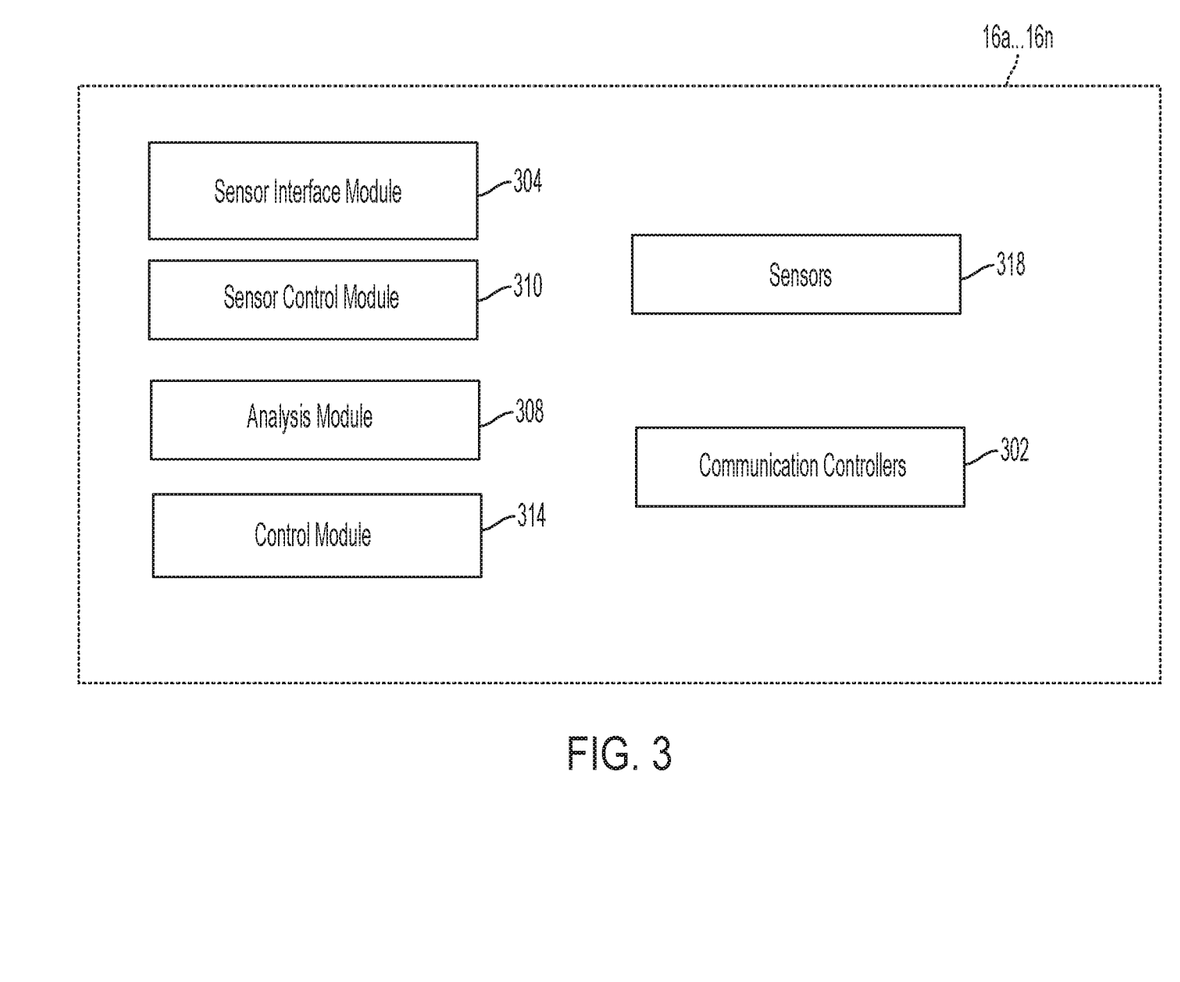
FIG. 3 illustrates an internal structural view of the sensors/circuitry/logic of FIG. 1, in accordance with embodiments of the present invention.

FIG. 3 illustrates an internal structural view of sensors/circuitry/logic 16a . . . 16n of FIG. 1, in accordance with embodiments of the present invention. Sensors/circuitry/logic 16a . . . 16n includes sensors 318, a sensor interface module 304, a sensor control module 310, an analysis module 308, a control module 314, and communication controllers 302. Sensors 318 may include any type of internal or external sensors including, inter alia, optical sensors, temperature sensors, infrared sensors, speed sensors, GPS sensors, moisture sensors, pressure sensors, motion detector sensors, video cameras, etc. Sensor interface module 304 comprises specialized hardware and software for controlling all functions related to interfacing with sensors 16a . . . 16n. Sensor control module 310 comprises specialized hardware and software for controlling all functionality related to controlling all functions related to control of Sensors/circuitry/logic 16a . . . 16n and implementing the process described with respect to the algorithm of FIG. 2. Analysis module 308 comprises specialized hardware and software for controlling all functions related to the algorithm of FIG. 2. Control module 314 comprises specialized hardware and software for controlling (in combination with hardware device) functions related to executing vehicle control actions with respect to auto drive and corrective action features. Communication controllers 302 are enabled for controlling all communications between sensors 318, sensor interface module 304, sensor control module 310, analysis module 308, and control module 314.

Figure 4:
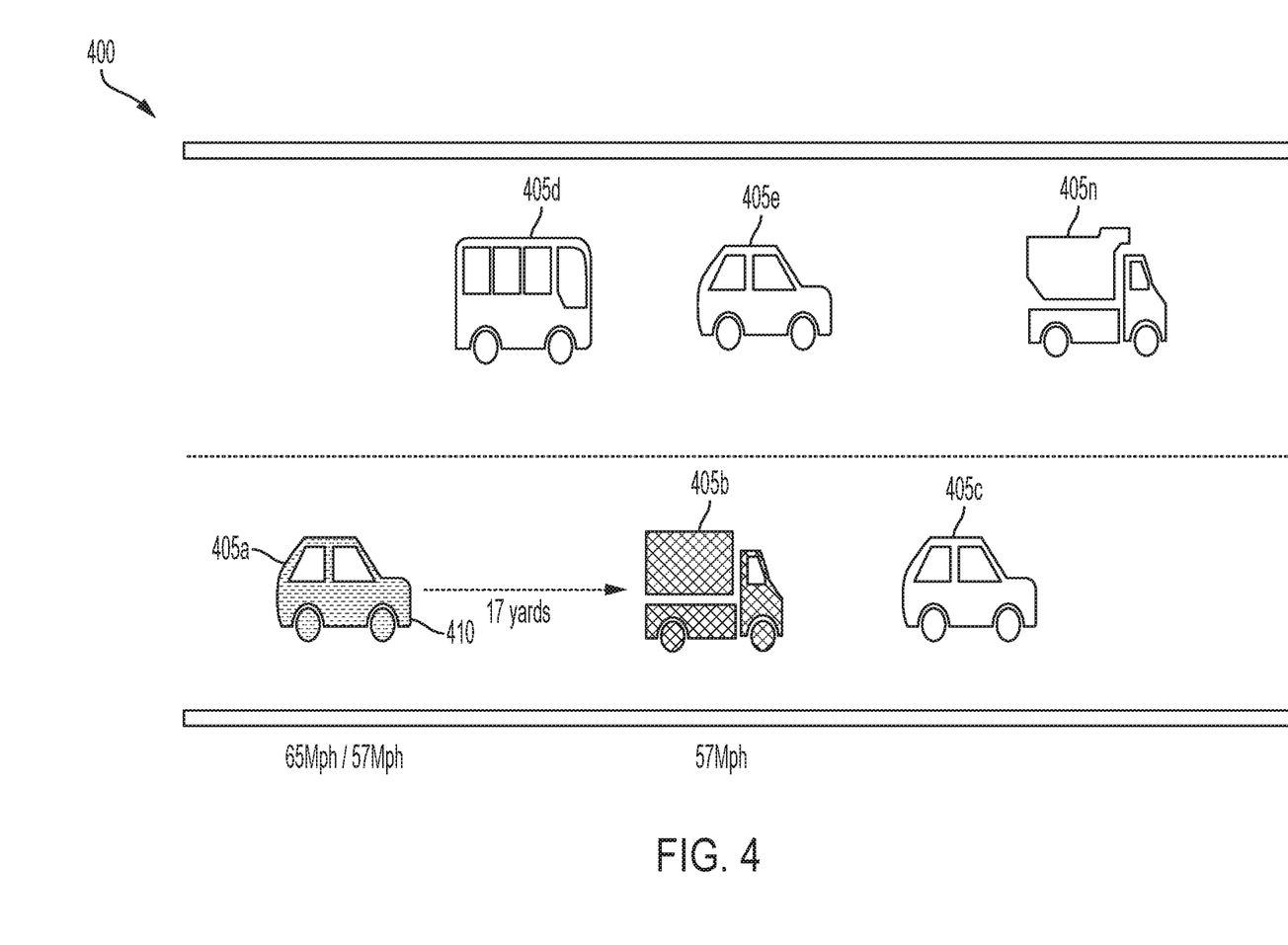
FIG. 4 illustrates a first implementation example associated with generating second order determinations with respect to a speed of travel of an autonomous vehicle, in accordance with embodiments of the present invention.

FIG. 4 illustrates a first implementation example 400 associated with generating second order determinations with respect to a speed of travel of an autonomous vehicle 405a, in accordance with embodiments of the present invention. The example described with respect to FIG. 4 illustrates a crowd sourced analysis scenario enabling autonomous vehicle 405a to detect faulty sensors by comparing its own values with derivative values obtained from nearby vehicles 405b . . . 405n. The derivative calculation (for the derivative values) is defined as a second order verification for deriving a speed of travel through association and calculations of alternative sensors used to derive the speed of travel. For example, autonomous vehicle 405a comprises two speed sensors (i.e., GPS and a speedometer) reporting two different speeds exceeding a predetermined threshold. The GPS is reporting a speed of 65 MPH and the speedometer is reporting a speed of 57 MPH. In order to determine an accurate speed measurement, autonomous vehicle 405a detects and locates a vehicle 405b traveling in front of autonomous vehicle, activates a distance sensor 410 (e.g., on a front bumper), measures a distance of 17 yards between the vehicles, and communicates with vehicle 405b for requesting a speed of travel of vehicle 405b. In response, vehicle 405b indicates a speed of travel of 57 MPH. Therefore, the detected speed of 65 MPH is determined to be false.

Figure 5:
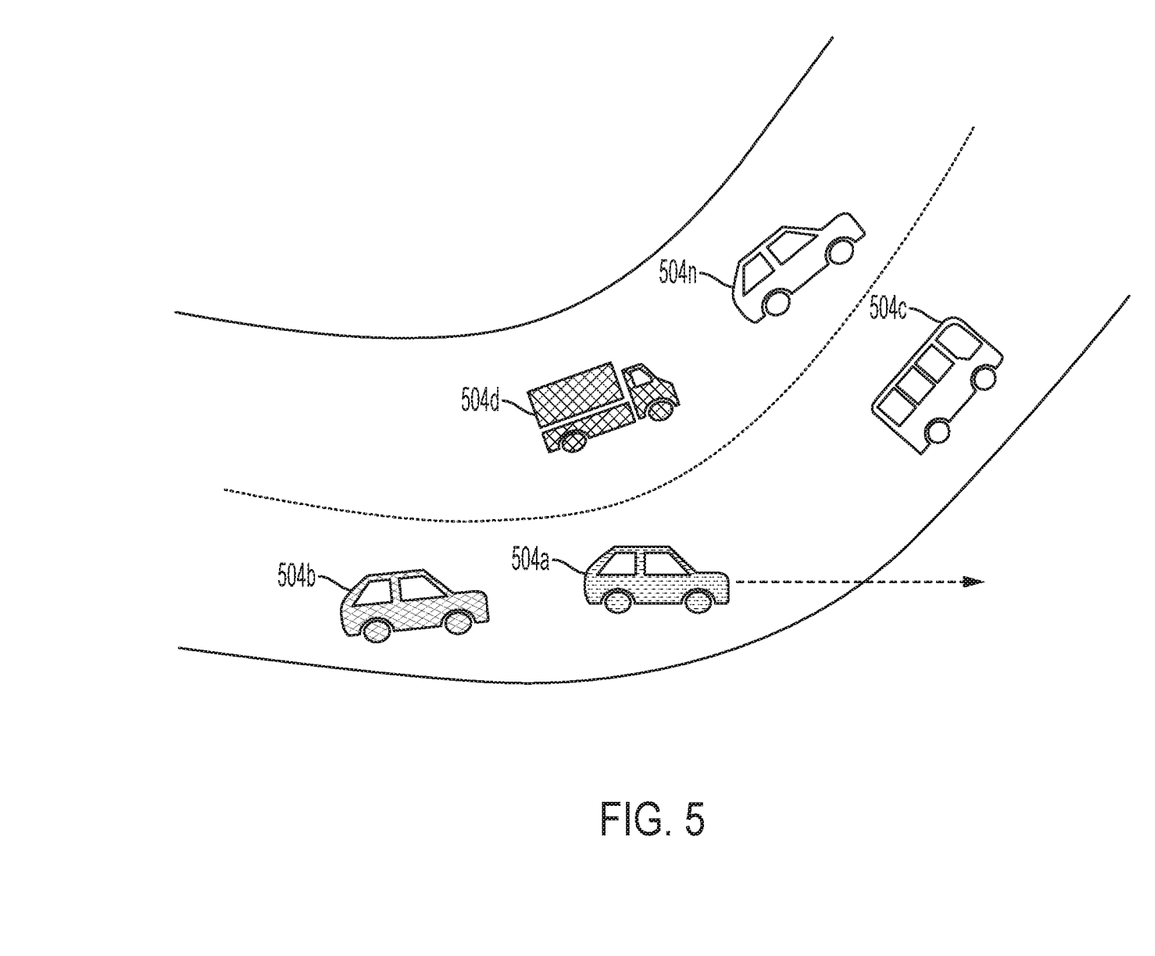
FIG. 5 illustrates a second implementation example associated with generating second order determinations with respect to a directional and cooperative scenario, in accordance with embodiments of the present invention.

FIG. 5 illustrates a second implementation example associated with generating second order determinations with respect to a directional and cooperative scenario, in accordance with embodiments of the present invention. The example described with respect to FIG. 5 illustrates an autonomous vehicle 504a comprising a compass sensor and a GPS sensor each reporting differing directions of travel exceeding a threshold. The GPS sensor illustrates an absolute heading of 45 degrees and the compass sensor illustrates an absolute heading of 62 degrees. Therefore, a controller within autonomous vehicle 504a vehicle locates and communicates with vehicles 504b . . . 504n for requesting a route destination (or a partial route indicating a current direction). Subsequently, the controller filters out any vehicles traveling in opposing directions or on neighboring roads leaving all vehicles traveling on the same road in a same direction such that associated absolute headings are transmitted back to autonomous vehicle 504a. In response, the controller places all remaining cooperating vehicle values within a table and removes outlier values. Additionally, all remaining values are averaged into a single actionable value.

Figure 6A:
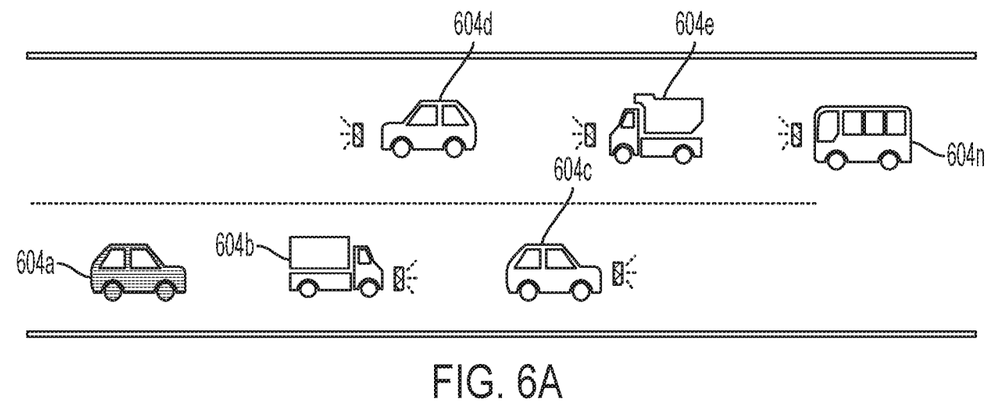
FIG. 6A illustrates a first implementation example associated with adjusting vehicle behaviors of an autonomous vehicle based on data received from a plurality of nearby vehicles, in accordance with embodiments of the present invention.

FIG. 6A illustrates a first implementation example associated with adjusting vehicle behaviors of an autonomous vehicle 604a based on data received from a plurality of nearby vehicles 604b . . . 604n, in accordance with embodiments of the present invention. For example, vehicle 604a is determined to be traveling without lights while vehicles 604b . . . 604n are currently using lights thereby determining that lights should be enabled.

Figure 6B:
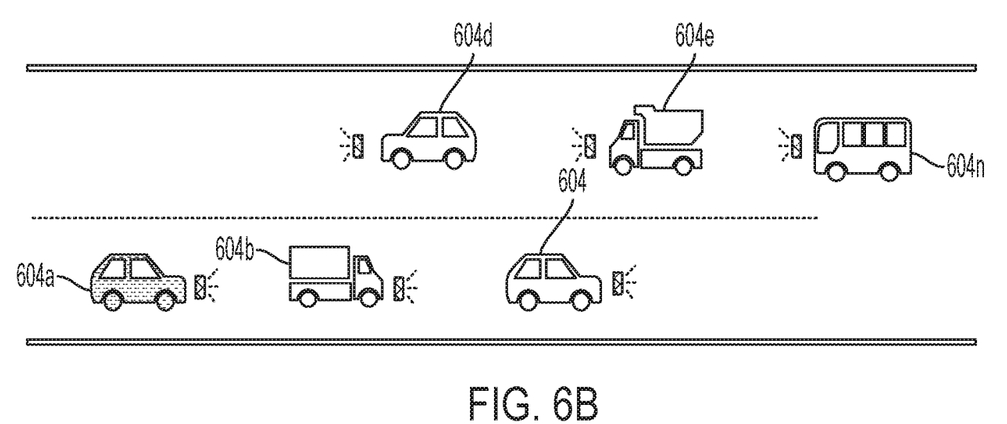
FIG. 6B illustrates vehicle activating associated lights based on the determination of FIG. 6A, in accordance with embodiments of the present invention.

FIG. 6B illustrates vehicle 604a activating associated lights based on the determination of FIG. 6A, in accordance with embodiments of the present invention.

Figure 7:
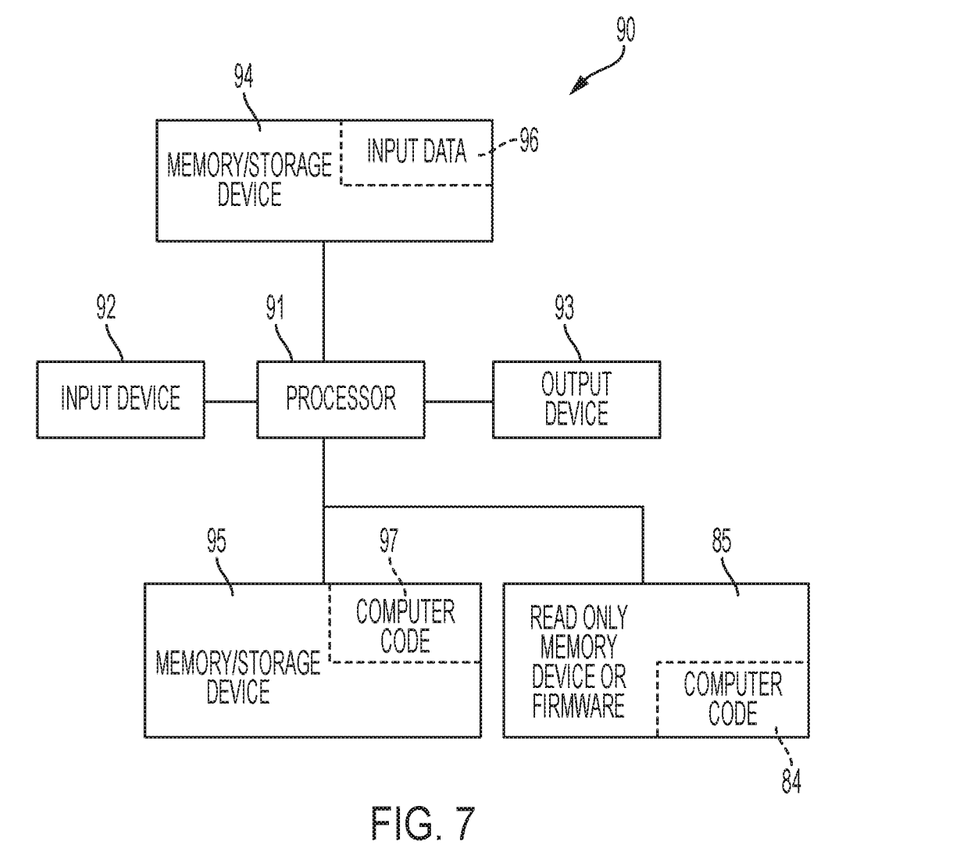
FIG. 7 illustrates a computer system for improving automotive technology by detecting vehicular sensor readings and detecting and correcting autonomous vehicular fault conditions, in accordance with embodiments of the present invention.

FIG. 7 illustrates a computer system 90 (e.g., hardware device 14) for improving automotive technology by detecting vehicular sensor readings and detecting and correcting autonomous vehicular fault conditions, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive (SDD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithm of FIG. 2) for improving automotive technology by detecting vehicular sensor readings and detecting and correcting autonomous vehicular fault conditions. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithm of FIG. 2 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithm of FIG. 2) may be stored on a static, nonremovable, read-only storage medium such as a Read-Only Memory (ROM) device 85, or may be accessed by processor 91 directly from such a static, nonremovable, read-only medium 85. Similarly, in some embodiments, stored computer program code 84 may be stored as computer-readable firmware 85, or may be accessed by processor 91 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve automotive technology by detecting vehicular sensor readings and detecting and correcting autonomous vehicular fault conditions. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for improving automotive technology by detecting vehicular sensor readings and detecting and correcting autonomous vehicular fault conditions. In another embodiment, the invention provides a business method that performs the process steps of the invention on a subscription, advertising, and/or fee basis. That is, a service supplier, such as a Solution Integrator, could offer to improve for improving automotive technology by detecting vehicular sensor readings and detecting and correcting autonomous vehicular fault conditions. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a particular configuration of hardware and software, any configuration of hardware and software, as would be known to a person of ordinary skill in the art, may be utilized for the purposes stated supra in conjunction with the particular computer system 90 of FIG. 7. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
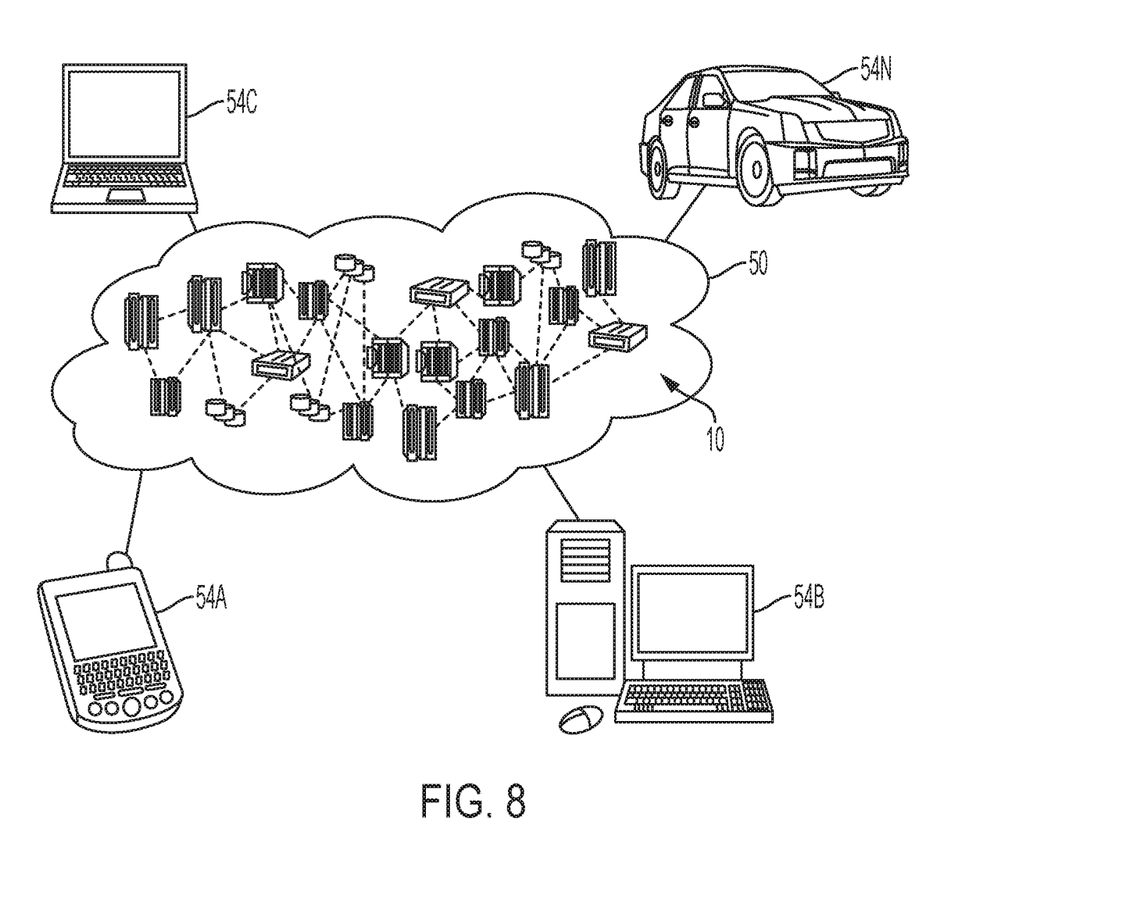
FIG. 8 illustrates a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 9:
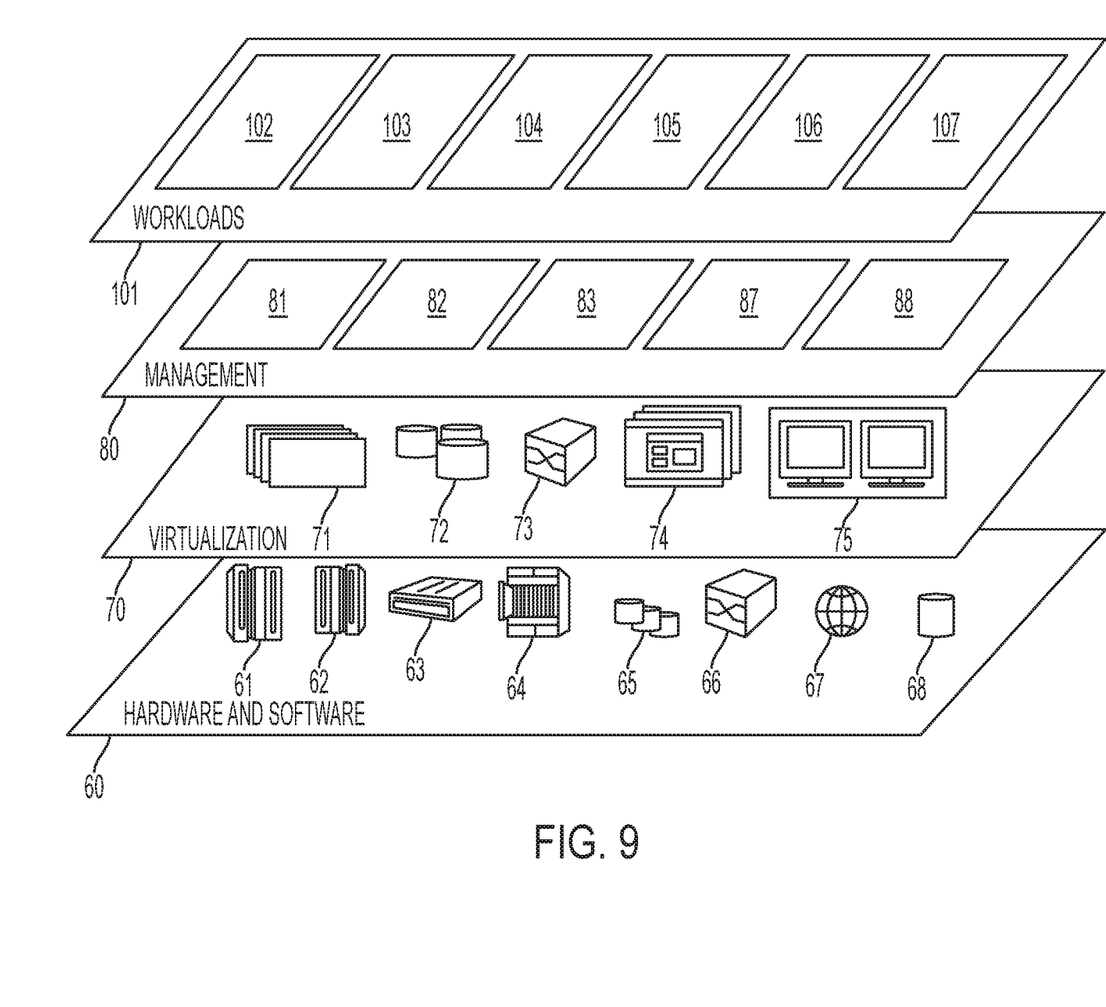
FIG. 9 illustrates a set of functional abstraction layers provided by cloud computing environment, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 104; data analytics processing 105; transaction processing 106; and for improving automotive technology by detecting vehicular sensor readings and detecting and correcting autonomous vehicular fault conditions 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. An autonomous vehicle detection method comprising:

enabling, by a processor of a hardware device within an autonomous vehicle, a plurality of sensors integrated with said autonomous vehicle, wherein said plurality of sensors comprise GPS sensors, speedometer sensors, weather sensors, windshield wiper sensors, outdoor light and vehicle lighting sensors, and automated driving mode on/off based sensors;

determining, by said processor via a sensor of said plurality of sensors, that said sensor appears to be associated with a healthy sensor status;

detecting, by said processor via the sensor of said plurality of sensors, a sensor reading exceeding a specified threshold value;

receiving in response to results of said detecting, by said processor from an additional plurality of sensors of an additional plurality of autonomous vehicles detected to be currently in motion within a specified distance of said autonomous vehicle and traveling in a same direction as said autonomous vehicle, additional sensor readings;

comparing, by said processor, said sensor reading to said additional sensor readings;

additionally comparing, by said processor, an additional reading of an additional sensor of said plurality of sensors integrated with said autonomous vehicle to said additional sensor readings, wherein said additional sensor differs in type from said sensor;

receiving, by said processor from said additional plurality of sensors, a detection indicating that a specific mode of a vehicle of said additional plurality of autonomous vehicles has disabled an automated driving mode;

determining, by said processor, an out-of-parameter sensor state associated with operational attributes of said autonomous vehicle including speed, acceleration, deceleration, transverse position with respect to a roadway, noise emitted, engine speed, all-wheel drive setting, headlight setting, vibration, operation of tandem unmanned autonomous vehicles, braking patterns, and engine temperature;

determining, by said processor based on said detection, said out-of-parameter sensor state, results of said comparing, and results of said additionally comparing, that said sensor is not associated with said healthy sensor status and comprises an accuracy issue and a fault condition associated with said sensor, wherein said results of said comparing indicate that said sensor reading differs from said additional sensor readings indicating a vehicle setting of said autonomous vehicle differing from plurality of autonomous vehicles in travel;

further determining, by said processor based on said detection, said out-of-parameter sensor state, and results of said comparing, an accident condition associated with a route of travel of said autonomous vehicle;

presenting, by said processor to an occupant of said autonomous vehicle, a notification indicating said fault condition and said accident condition;

transmitting, by said processor, said notification to a repair facility; and automatically directing and controlling, by said processor, such that said autonomous vehicle automatically initiates motion and travels to said repair facility.

2. The method of claim 1, further comprising:
generating, by said processor, a corrective action for automatically repairing said fault condition; and
executing, by said processor, said corrective action.

3. The method of claim 2, wherein said corrective action comprises an automated repair of software associated with said sensor.

4. The method of claim 1, wherein said additional sensor readings indicate directional and speed of motion readings of said additional plurality of autonomous vehicles.

5. The method of claim 1, wherein said fault condition indicates an accuracy level and health condition of said sensor.

6. The method of claim 1, wherein said fault condition indicates failure of said sensor.

7. The method of claim 1, wherein said sensor reading indicates a geographical location of said autonomous vehicle, and wherein said additional sensor readings indicate geographical readings of said additional plurality of autonomous vehicles.

8. The method of claim 1, further comprising:
determining, by said processor based on results of said comparing, driving patterns of said autonomous vehicle with respect to driving patterns of said additional plurality of autonomous vehicles.

9. The method of claim 1, further comprising:
determining, by said processor based on results of said comparing, driving based emergencies with respect to a travel route of said autonomous vehicle.

10. The method of claim 1, further comprising:
generating, by said processor based on results of said comparing, an alert indicating that at least one vehicle of said additional plurality of vehicles is executing traveling parameters differing from traveling parameters executed by said additional plurality of autonomous vehicles; and
presenting, by said processor to said least one vehicle, said alert.

11. The method of claim 1, wherein said method further comprises:
generating, by said processor based on results of said comparing, an alert indicating that said additional plurality of autonomous vehicles have simultaneously disabled autonomous features of said additional plurality of vehicles; and
presenting, by said processor to said autonomous vehicle, said alert.

12. The method of claim 1, further comprising:
generating, by said processor based on results of said comparing, an alert indicating that said additional plurality of autonomous vehicles are currently executing vehicular functions differing from vehicular functions currently executed by said autonomous vehicle; and
presenting, by said processor to said autonomous vehicle, said alert.

13. The method of claim 1, further comprising:
identifying, by said processor based on results of said comparing, risk levels associated with driving conditions of said autonomous vehicle.

14. The method of claim 1, further comprising:
detecting, by said processor via a second sensor of said plurality of sensors, a second sensor reading;
additionally comparing, by said processor, said sensor reading to said second sensor reading; and
determining, by said processor based on results of said additionally comparing, that said sensor reading differs from said second sensor reading, wherein said determining said fault condition is further based on said determining that said sensor reading differs from said second sensor reading.

* * * * *